INVENTOR:
HANS LINDEMANN

BY: Craig & Antonelli
ATTORNEYS

Sept. 15, 1970          H. LINDEMANN          3,528,327
MACHINE TOOL WITH ROTARY CUTTER HEAD
AND FEEDING MECHANISM THEREFOR Filed Jan. 18, 1968          3 Sheets-Sheet 3

INVENTOR
HANS LINDEMANN

BY Craig & Antonelli
ATTORNEYS

United States Patent Office 3,528,327
Patented Sept. 15, 1970

3,528,327
MACHINE TOOL WITH ROTARY CUTTER HEAD
AND FEEDING MECHANISM THEREFOR
Hans Lindemann, Lendenstrasse 39, Grossdornberg,
near Bielefeld, Germany
Filed Jan. 18, 1968, Ser. No. 698,818
Claims priority, application Germany, Feb. 10, 1967,
L 55,712
Int. Cl. B23b 5/12
U.S. Cl. 82—20 4 Claims

ABSTRACT OF THE DISCLOSURE

A machine tool called a "scalping" machine in which solid or tubular rod stock is clamped nonrotatably and fed continuously to and through a revolving cutter head by two clamping and feeding devices in front of and behind the cutter head. At least this second clamping device carries out short longitudinal reciprocating movements close to the cutter head by first clamping the workpiece tightly shortly behind the cutter head and drawing it for a short distance in the feeding direction, then releasing it sufficiently so as to be able to slide back along the workpiece to its original position while remaining in guiding engagement with the workpiece so as to form a vibration node to eliminate the vibrations of the workpiece which are caused by the cutting operation. If two similar reciprocating clamping devices are provided in front of and behind the cutter head, they are operated in alternate succession so that while one clamps and feeds the workpiece, the other slides back along and guides the workpiece.

---

The present invention relates to improvements in machine tools, so-called "scalping" machines, in which solid or tubular rod stock while nonrotatably clamped is machined by being fed longitudinally through a revolving cutter head. More particularly, this invention relates to a clamping mechanism for feeding the rod stock through the scalping machine by means of two clamping and feeding devices in front of and behind the cutter head.

For feeding rod stock through a scalping machine so as to be machined therein by its revolving cutter head, it is conventional either to employ feeding and withdrawing rollers or clamping carriages which are located in front of and behind the actual scalping machine and are movable back and forth in the feeding direction of the workpiece. It is also known to provide a combination of these different feeding means. The feeding and drawing rollers and/or the clamping carriages also serve to prevent the workpiece to be machined from turning about its longitudinal axis. The clamping carriages were usually designed so that their clamping means which prevent the workpiece from turning and move it in its feeding direction were either located outside of the actual scalping machine or, if relatively short workpieces were to be machined, were movable into the scalping machine up to the guide means which were mounted immediately in front of and immediately behind the revolving cutter head and were adapted to form vibration nodes whereby the natural frequency of the workpiece between these guide means was considerably increased. Thus, no resonance with the undesirable vibrations could occur which are produced by the scalping operation of the revolving cutter head and the workpieces could therefore be machined very accurately to the desired dimensions and without chattering. Depending upon whether solid rod stock or tubular workpieces were to be machined, either external or internal clamping means were employed which could then be moved up to a point close to the guide means which were mounted in a fixed position on the machine housing at points closely adjacent to the cutter head. If the clamping means of the clamping carriages were made of such a construction, it was therefore possible also to machine relatively short workpieces. The reciprocating movements of the clamping carriages of the known scalping machines were controlled by limit switches in such a manner that the workpiece to be scalped was secured against rotation at all times by at least one of the two clamping carriages. When the clamping carriage which was movable in front of the revolving cutter head had fed the workpiece for a certain distance and had moved it through the cutter head and the subsequent guide means, the second clamping carriage behind the cutter head was started to move in the feeding direction. When this second carriage reached the desired feeding speed of the workpiece, its clamping means were actuated to clamp the workpiece tightly and thus prevented it from turning and conveyed it further in the feeding direction. The clamping means of the first carriage in front of the cutter head then released the workpiece and this carriage was then moved back to its original position. The polarity of the motor for driving the first clamping carriage was then reversed so as to move it again in the feeding direction until it reached the desired feeding speed. Its clamping means then clamped the workpiece and moved it in the feeding direction. The clamping means of the second carriage behind the cutter head then released the workpiece and this carriage was then moved back to its original position. These operations were then repeated in the same order as long as necessary.

It is an object of the present invention to provide a scalping machine which is of a more simple construction and may be manufactured at a considerably lower cost than the known scalping machines as above described.

The present invention is based upon the well-known fact that, in order to attain a relatively high cutting output of the scalping machine and to avoid chattering it is necessary to provide suitable guide means directly in front of and directly behind the revolving cutter head which are designed so as to form vibration nodes at the points where they act upon the workpiece so as to counteract and eliminate the vibrations which occur during the scalping operation. According to the present invention it has now been found that the feeding and withdrawing rollers and/or the clamping carriages may be omitted if suitable means are provided which are adapted to carry out the functions of both of these means and not only prevent the workpiece from turning but also move it in the feeding direction. Consequently, the feeding means as were previously required are now no longer necessary and the scalping machine according to the invention may therefore by produced at about two-thirds of the cost of one of the known scalping machines.

According to the present invention, the clamping means of each clamping mechanism which serves for moving the workpiece to be scalped in the feeding direction is designed so as to remain in engagement with the workpiece also at those times when it is not tightened thereon and then to engage with it sufficiently so as to be slidable along the workpiece while guiding it so as to form a vibration node. In the previous scalping machines, this could be accomplished only by providing additional guide means directly in front of and directly behind the cutter head. Consequently, the clamping means according to the invention carry out not only the functions of the feeding and clamping means as previously employed, but also those of the guide means which were previously required.

Since the clamping devices according to the invention also have the purpose of forming vibration nodes in order to prevent resonances, these devices must be designed so that the maximum distance between the clamping device which is located in front of the cutter heat and the clamping device behind the cutter head will not exceed a certain value. Therefore, the strokes at least of the reciprocating clamping device behind the cutter head or those of both reciprocating clamping devices, if provided, also must not exceed a certain distance. Since the clamping means are thus always moving back and forth in the immediate vicinity of the cutter head, the scalp machine according to the invention also permits workpieces of a relatively short length and even such workpieces of a relatively large diameter, for example, forged workpieces, to be properly machined.

The features and advantages of the present invention will become more clearly apparent from the following detailed description thereof which is to be read with reference to the accompanying diagrammatic drawings, in which:

FIG. 2 shows a similar cross section of another scalping machine, in which two clamping devices according to the invention, both also serving as guiding means, are provided at the opposite sides of the cutter head; while

Figure 1:
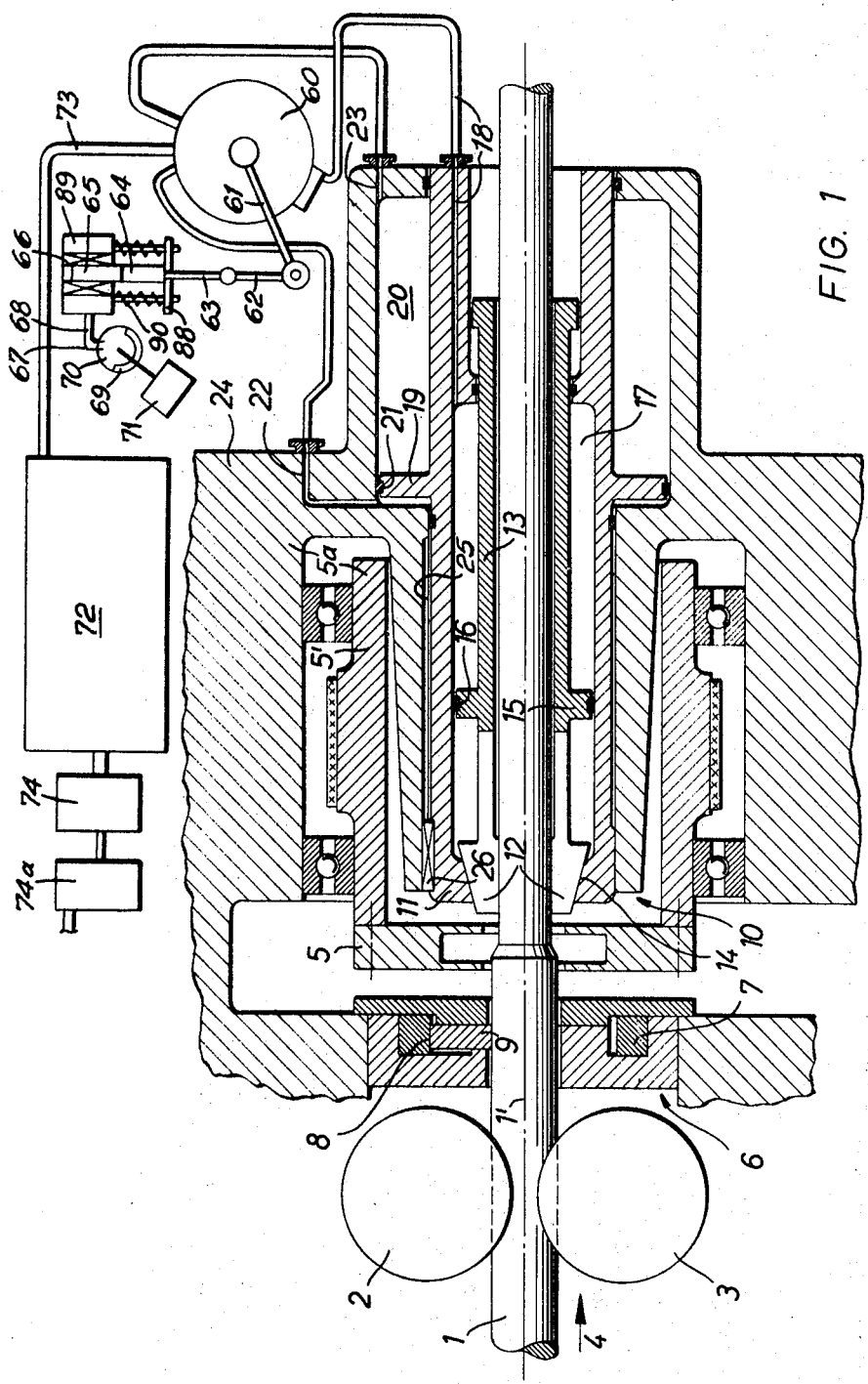
FIG. 1 shows a cross section of a scalping machine according to the invention which is provided with only one reciprocating clamping device behind the cutter head which also serves as a guiding device.

As illustrated in FIG. 1, the workpiece 1 to be machined in the scalping machine according to the invention which may be either solid or tubular rod stock is nonrotatably gripped by power-driven feed rollers 2 and 3 and fed by the latter in the direction of the arrow 4 to the cutter head 5 which is secured to one end of a short tubular shaft 5a which is rotatably mounted in bearings within the machine housing 24 and is driven, for example, by a belt. Directly in front of the revolving cutter head 5, a guiding device 6 is mounted on the machine housing 24. This guiding device may be of a conventional construction and comprise guide jaws 9 which by means of a spring, not shown, are uniformly contracted by associated cam surfaces 8 within an annular supporting element 7 so as to engage with and guide the workpiece 1 without clamping the same and to maintain it coaxially to the cutter head 5. In place of such guide jaws 9, the guiding device may also be provided with guide rollers. Also, instead of one set of such guide jaws or guide rollers, the guiding device may also comprise two sets which are adjustable independently of each other within two supporting elements 7. Immediately behind the cutter head 5 where in previous scalping machines another guiding device was mounted, the machine according to the invention is provided with a clamping device 10 which in addition to its function of clamping and feeding the workpiece also serves the function of a guiding device. In this particular case, this clamping device consists of a collet 13 in the form of a sleeve which is split at one end so as to form several clamping jaws 12 and is disposed within a tubular supporting element 11. In place of such a collet-type clamping device, it is also possible to employ one of any other suitable construction which is adapted to form vibration nodes to eliminate the vibrations of the workpiece. Thus, for example, it may be of a construction similar to that of the guiding device 6 if it is modified so as also to carry out a reciprocating motion in the feeding direction of the workpiece and to grip the workpiece tightly while feeding it. Aside from its clamping and feeding action it is therefore the essential feature of this clamping device that at the points where its jaws 12 engage with the workpiece, it forms a vibration node so that no vibrations can occur which are in resonance with the frequency of the vibrations which are produced by the chip cutting operation of the revolving cutter head.

The jaws 12 of collet 13 are centered by the conical inner surfaces 14 of the supporting element 11 so that, when the jaws are tightened by an axial movement of the supporting element 11 relative to the collet 13, they will be moved equally in radial directions coaxially to the workpiece 1. Intermediate its ends, collet 13 is provided with an annular flange 15 which serves as a piston and carries a gasket 16 on its peripheral surface and is slidable along the cylindrical inner wall of the chamber 17 in the supporting element 11. When a pressure medium such as compressed air, oil under pressure, or the like is passed through a conduit 18 into the annular chamber 17, collet 13 will be shifted in the direction opposite to that of the arrow 4, whereby the normal inner diameter of jaws 12 will be reduced. In order to insure that a vibration node will always be formed by the jaws 12 on the workpiece 1 when the latter is not tightly clamped by these jaws, the pressure which is supplied to chamber 17 must be accurately controlled so that the workpiece is still sidable between the jaws in the direction of the arrow 4 without being scored or seized by the jaws.

Since during the rotation of the cutter head 5 it is necessary to move the clamping device 10 periodically for a certain distance in the feeding direction as shown by the arrow 4 and in the opposite direction, the supporting element is likewise provided with an annular flange 19 which serves as a piston in a cylindrical chamber 20 the wall of which may form an integral part of the housing 24. This piston-like flange 19 is like-wise provided with a gasket 21 which is slidably tightly along the inner wall of chamber 20. When compressed air or oil under pressure is passed through a conduit 22 to the left side of flange 19 in chamber 20, the supporting element 11 will be moved in the direction of the arrow 4, while when the compressed air or oil is passed through a conduit 23 into chamber 20 at the right side of flange 19, the supporting element 11 will be moved in the opposite direction. A rotary movement of the supporting element 11 is prevented by at least one spline 26 which is slidable within a groove 25. Since the clamping device 10 has not only the purpose to effect the forward feed of the workpiece 1, but also to form a vibration node when the workpiece which is being scalped is no longer clamped by the feed rollers 2 and 3, the jaws 12 must clamp the workpiece so as to prevent it from turning when the supporting element 11 is being shifted in the direction of the arrow 4. It is for this purpose necessary when the pressure medium is passed through the conduit 22 into the chamber 20 at the left side of the piston-like flange 19 also to pass a pressure medium through the conduit 18 into the chamber 17 at the right side of flange 15 and to maintain both pressures until the clamping device 10 has carried out the necessary stroke. When the supporting element 11 is thereafter moved back in the direction opposite to that of the arrow 4 by passing a pressure medium through the conduit 23 into chamber 20 at the right side of flange 19, the pressure in chamber 17 is also reduced, but only to such an extent that the jaws 12 will remain in sliding engagement with the workpiece 1 so that a vibration node will still be maintained by the jaws 12. The clamping device according to the invention which may also be replaced by a clamping device of a different construction therefore eliminates the need for a separate guiding device which prior to this invention had to be provided directly behind the cutter head.

The conduits 18, 22, 23 are connected to a control member 60 having a regulating element associated therewith and adjustable by means of a lever 61. A guide arm 62 hingedly connects the regulating elements of control member 60 to a rod 63. The rod 63 is, in turn, connected with a magnetically controlled bar 64. A guide rod 65 is fixedly attached to bar 64 and both rod 65 and bar 64 are surrounded by a coil body 66 to which current is fed through lines 67, 68. Bar 64 is attached to a yoke 88 which is guided by rods with respect to a housing 89 and is under the bias of springs 90. The springs return the bar 64 into the position illustrated on FIG. 1 when no current is being supplied to the coil body 66.

A disk 70 is driven by a motor 71 and is covered with an electrically conductive material. When disk 70 rotates, current is fed to the coil body 66 through lines 67, 68 during a selectable period of time, while at another selectable time, no current flows. As shown in FIG. 1, no current is flowing and lever 61 is disposed in the illustrated position. Compressed air can then be supplied from a compressed air tank 72 through conduit 73 to the control member 60 and then into conduits 18, 22. As a result, the device 10 will be moved by means of annular flange 19 in the direction of arrow 4 and, simultaneously, the jaws 12 are fixedly clamped on the turned workpiece 1 by means of annular flange 15. Upon further rotation of the disk 70, current is then supplied to the coil body 66 and lever 61 is pivoted upwardly so that compressed air flowing through conduit 73 now flows into conduit 23 and partially into conduit 18. The clamping device 10 is then moved in the opposite direction of the arrow 4, while the jaws 12 remain in contact with the workpiece, but under diminished pressure, in order to effect an oscillation node. The compresesd air is constantly supplied to tank 72 by means of a pump 74 driven by a motor 74a so that the required amount of air is always available to conduits 18, 22, 23.

Although in a continuous operation of scalping a succession of workpieces, one workpiece will automatically eject another which has been previously machined, it is also possible to withdraw the scalped workpieces by hand if the pressure in chamber 17 is reduced sufficiently.

Figure 2:
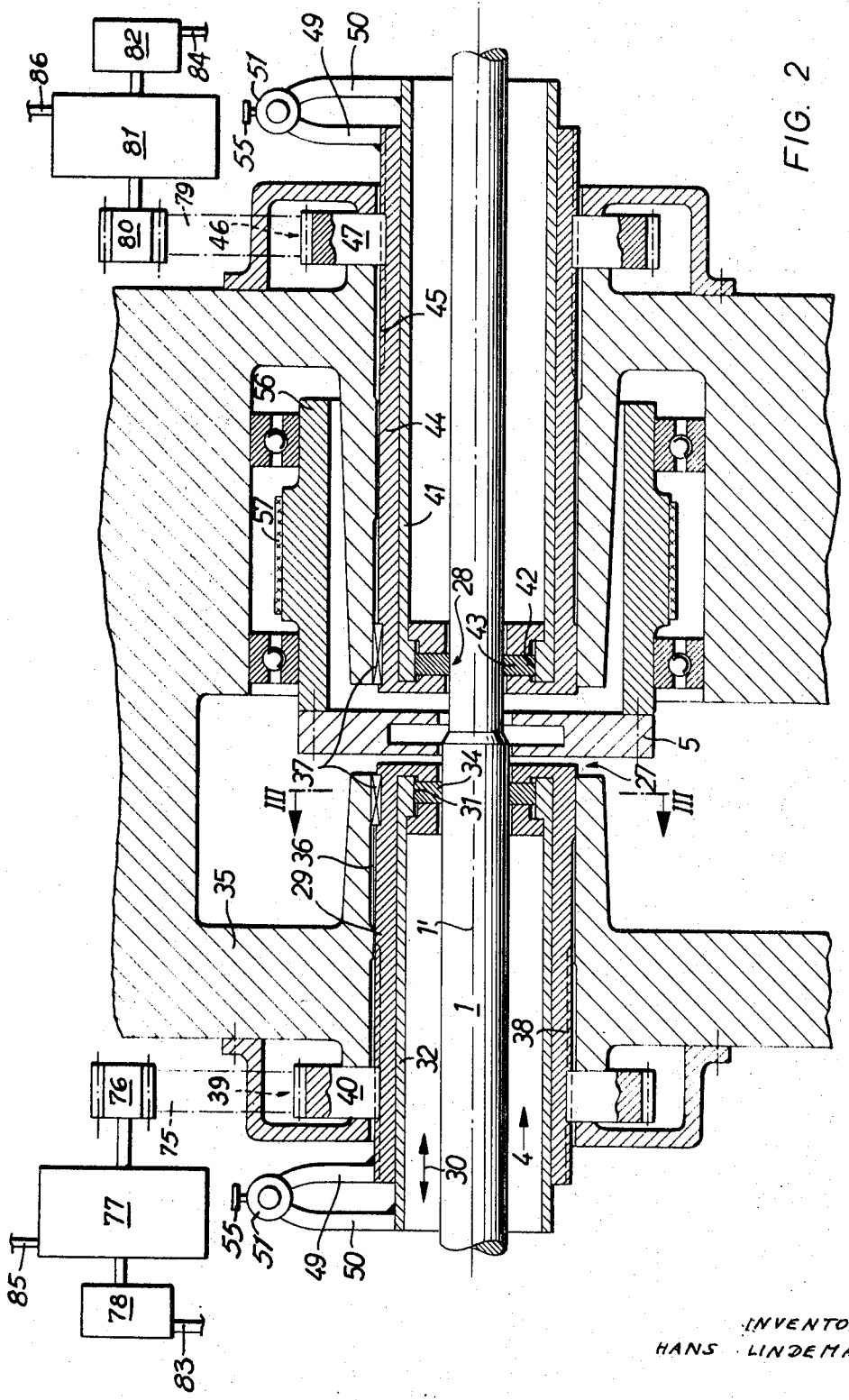

FIG. 2 illustrates a scalping machine in which no separate means for guiding the workpiece are provided on either side of the revolving cutter head 5. The workpiece 1 is fed in this machine in the direction of the arrow 4 by means of clamping devices 27 and 28 which may be of a conventional type and are located directly in front of and directly behind the cutter head 5 and are adapted to carry out controlled forward and backward movements. The clamping device 27 is mounted within a tubular element 29 which is movable back and forth in the direction of the double-arrow 30. The supporting element 32 of the clamping device 27 which is provided with inner cam surfaces 31 is extended in the axial direction toward the rear so to permit it to be turned within the tubular element 29 about the longitudinal axis 1' of the workpiece 1, for example, by means of a gear or the like or by the means as subsequently described with reference to FIG. 3. When the supporting element 32 is turned in one direction or the other, the parts of the clamping device 27 which engage upon the workpiece 1, that is, in this case the jaws 34, will be pressed more or less tightly against the peripheral surface of the workpiece. The minimum pressure which is thus exerted upon the jaws 34 or the like must be so high that the latter will form and maintain a vibration node at the points where these jaws act upon the workpiece 1. If by turning the supporting element 32 this pressure is increased, the clamping device 27 will also prevent any rotaiton of the workpiece 1. The tubular element 29 must therefore be prevented from turning relative to the machine housing 35 which is attained by a spline 37 which is slidable within a groove 36. For moving the tubular element 29 back and forth, it is provided with an external screw thread 38 upon which a nut 40 is screwed which is secured to or integral with a gear which may be driven, for example, by a chain 39. Since this nut 40 is prevented from moving in its axial direction, it will, when being turned about the axis 1' by the chain 39, shift the tubular element 29 in one longitudinal direction or the other depending upon the direction in which the chain 39 or the like is driven. The extent of the required strokes of the clamping device 27 in the direction of the double-arrow 30 may be accurately controlled by a suitable control of the movements of the chain 39 which may be driven by a speed-reduction drive the movements of which may, in turn, be controlled, for example, by limit switches.

The second clamping device 28 of the machine according to FIG. 2 which is located directly behind the revolving cutter head 5 has substantially the same function and is of substantially the same construction as the clamping device 27. The supporting element 41 acts by means of its cam surfaces 42 upon the jaws 43 which, however, may also in this case be replaced by other elements such as rollers or the like. If such rollers are employed, provision must, however, be made to prevent them from turning about their axes during the reciprocating movements of the clamping device. The tubular element 44 is movable back and forth in its axial direction like the element 29 and it is prevented from turning relative to the machine housing 35 by a spline 37 which is slidable in a groove 36. By means of an external screw thread 45 on which a nut 47 is screwed which may be secured to or integral with a gear which may be driven, for example, by a chain 46, the clamping device 28 may be moved back and forth as required. The operations of turning the supporting element 41 about the axis 1' may be carried out by a gear or the like or by the means as subsequently described.

In FIG. 2, the nut 40 is driven through, for example, a chain 75 and a sprocket wheel 76. Nut 40 can also be driven by a gear arrangement. The sprocket wheel 76 is driven, in turn, by a servomotor 77 powered by an electric motor 78. The servomotor 77 switches or shifts the direction of rotation of sprocket wheel 76 in selected intervals. Similar considerations apply for the drive of nut 47. For example, nut 47 is rotated in either direction through a chain 79 and sprocket wheel 80. The sprocket wheel 80 is similarly connected with a servomotor 81 drive by a motor 82.

The current supply to motors 78, 82 is represented by lines 83, 84, respectively. Lines 85, 86 lead to, respectively, one switching mechanism 87 shown in FIG. 3 and corresponding in its construction to the device represented by numerals 63–66 in FIG. 1. By appropriate control of mechanism 87, arm 91 of a valve 92 is then pivoted to introduce air into a cylinder 51 through conduit 93. This compressed air is supplied from a compressed air tank 94 having a pump 96 which is driven by a motor 95. In operation, control pulses are produced by the servomotors 77, 81.

Figure 3:
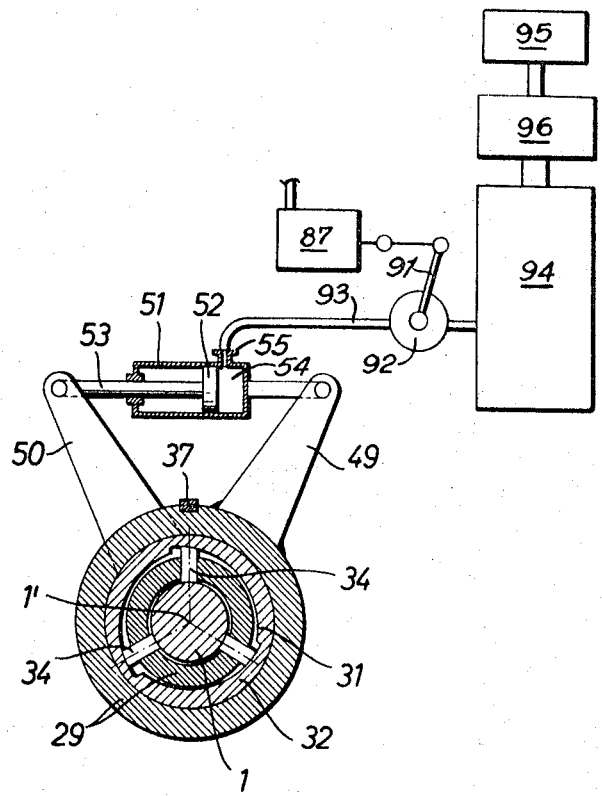
FIG. 3 shows an end view of one of the clamping devices according to FIG. 2.

Although as previously stated the clamping devices 27 and 28 may be of various types of construction and may also differ from each other, those as previously described and illustrated in FIG. 2 are substantially alike and a detailed description of the clamping device 27 which is to be read with reference to FIG. 3 will also adequately explain the structure and functions of the clamping device 28. This clamping device 27 comprises the tubular supporting element 32 the inner wall of which is provided with arcuate cam surfaces 31 which act equally in radial directions upon the jaws 34 so that the clamping surfaces of the latter when tightened or released by a rotation of the element 32 in one or the other direction will at all times be disposed concentrically to the axis 1' of the revolving cutter head 5. The tubular element 29 is provided with an arm 49 and the supporting element 32 with an arm 50. This arm 49 has a cylinder 51 pivotably connected thereto in which a piston 52 is slidable, the piston rod 53 of which is pivotably connected to the other arm 50. For reducing the effective inner diameter of the clamping device 27 to such an extent that the jaws 34 will engage with and form a vibration node on the workpiece 1, a pressure medium is passed through a conduit 55 into the cylinder chamber 54 so as to produce the requisite pressure therein at which the workpiece is still slidable in the axial direction relative to the jaws 34. When the clamping device 27 should act as a means for feeding the workpiece 1, the pressure in chamber 54 is to be increased so that the jaws 34 or the like will clamp the workpiece so tightly that it cannot turn relative to the jaws. The workpiece is then supported relative to the machine housing 35 by means of the clamping device 27 and the tubular element 29 and will be fed in the forward direction by the movement of the tubular element 29 in its longitudinal direction, as seen in FIG. 2. When the clamping device 27 reaches a point at a short distance from its inner or forward end position, the jaws 43 or the like of the other clamping device 28 are tightened and pressed against the workpiece 1 so as to prevent any rotation thereof, and the nut 47 or the like is then turned in accordance with the feeding speed of the workpiece so that both clamping devices 27 and 28 will then move together with the workpiece. The relatively high pressure in chamber 54 may then be reduced to such an extent that the clamping device 27 while still forming a vibration node can be moved back to its original position from which it may thereafter again be moved in the feeding direction after the clamping device 28 has reached its outer or rear end position. What has been said about the operation of the clamping device 27 also applies to the operation of the clamping device 28. Therefore, the clamping device 28 and its tubular element 44 may be controlled in the same manner as previously described with reference to the operation of the clamping device 27 and its tubular element 29. Of course, in place of the hydraulic or pneumatic means 51 to 55 it is also possible to provide other suitable means which will effect the necessary adjustments of the clamping devices as previously described.

In addition it may be mentioned that the cutter head 5 according to FIG. 2 is designed like the one as shown in FIG. 1 and is also secured to a hollow shaft 56 which is rotatably mounted in the machine housing 35 and may be driven, for example, by a belt 57.

If the reciprocating movements of the two clamping devices 27 and 28 are properly controlled by suitable means, not shown, so as to occur in the proper order of succession and to be of the most suitable length, it is now possible to machine workpieces of practically any length and also of a much shorter length than could be machined by scalping machines of previous designs. For the most efficient and accurate operation of the scalping machine it is advisable to carry out the retracting movements of the released clamping device 10 according to FIG. 1 or of both released clamping devices 27 and 28 according to FIG. 2 at a higher speed than their feeding strokes when they clamp the workpiece tightly.

The present invention may also be applied to existing scalping machines of certain previous types which are provided with clamping carriages and internally or externally acting clamping devices. These devices would then have to be modified so as to operate in accordance with the invention by also functioning as guiding means so as to permit the separate guiding devices to be eliminated which were previously required.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A scalping machine comprising a rotary cutter head, means for rotating said cutter head, feeding means at both sides of said cutter head for feeding a workpiece non-rotatably in one direction toward the front side of and through said cutter head and for then withdrawing it in said direction from the rear side of said cutter head, said feeding means at least at one side of said cutter head comprising clamping means, means for reciprocating said clamping means in said feeding direction so as to carry out successive feeding and return strokes within an area closely adjacent to said cutter head, and means for tightening said clamping means on said workpiece at least during a part of each of said feeding strokes and for releasing said clamping means during each of said return strokes to such an extent as to remain in sliding engagement with said workpiece so as to guide the same and form a vibration node.

2. A scalping machine as defined in claim 1, wherein said feeding means on each side of said cutter head comprise said clamping, reciprocating, tightening and releasing means, and further comprising control means for operating said feeding means in alternate succession so that while said feeding means at one side of said cutter head clamp and feed said workpiece in said feeding direction, said feeding means at the other side of said cutter head slide back along and guide said workpiece.

3. A scalping machine as defined in claim 1, further comprising control means for carrying out said return strokes at a higher speed than said feeding strokes.

4. A scalping machine as defined in claim 1, wherein said clamping means comprise an annular supporting member having inclined inner surfaces, and a plurality of clamping members within said supporting member and adapted to be moved equally in radial directions by said inclined surfaces when said supporting member is moved in one or another of two opposite directions so as to maintain said workpiece at all times coaxially to said cutter head.

References Cited

UNITED STATES PATENTS 2,427,322  9/1947  Darner _____ 82—20

FOREIGN PATENTS 1,120,836  12/1961  Germany.
1,188,413  3/1965  Germany.
745,547  2/1956  Great Britain.

LEONIDAS VLACHOS, Primary Examiner